United States Patent Office

3,509,222
Patented Apr. 28, 1970

---

3,509,222
(1-BROMO-1-(BROMOMETHYL)-3,3,3-TRICHLORO-PROPYL)BENZENE COMPOUNDS
Joseph H. Howe, Chattanooga, Tenn., and Leo R. Morris, Midland, Mich., assignors to The Dow Chemical Company, Midland, Mich., a corporation of Delaware
No Drawing. Filed June 5, 1967, Ser. No. 643,340
Int. Cl. C07c 25/04, 25/06, 25/14
U.S. Cl. 260—651         5 Claims

---

ABSTRACT OF THE DISCLOSURE (1 - bromo-1-(bromomethyl)-3,3,3-trichloropropyl)benzene compounds of the formula:

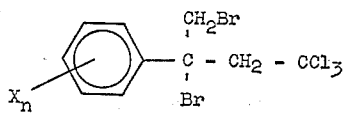

wherein X represents bromo, chloro, nitro, cyano, or (trifluoromethyl) and n represents an integer of from 0 to 1, both inclusive, are useful as agents to control the growth of plants.

---

DETAILED DESCRIPTION OF THE INVENTION

As set forth hereinabove in the abstract, the present invention is directed to (1-bromo-1-(bromomethyl)-3,3,3-trichloropropyl)benzene compounds of the formula:

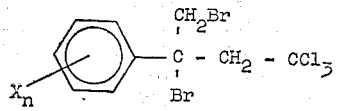

wherein X represents bromo, chloro, nitro, cyano, or (trifluoromethyl) and $n$ represents an integer of from 0 to 1, both inclusive. At room temperatures and pressures, the products are crystalline solids or viscous liquids, more typically the latter. They are, as noted above, useful as agents to control the growth of plants.

The products of the present invention are readily prepared by the bromination of corresponding unsaturated compounds of the formula:

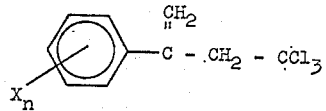

The bromination reaction is conveniently carried out in an inert liquid reaction medium, typically an organic liquid. Preferred liquids for this purpose are carbon tetrachloride and chloroform. The bromine can be added to a solution of the unsaturated compound and the liquid reaction medium, or the bromine can be added to the liquid reaction medium and the unsaturated compound thereafter added.

The reaction goes forward readily under a wide range of temperatures, such as from 0 to the boiling temperature of the solvent; generally, however, temperatures from 20 to 40° C. are convenient and give good results. The reaction consumes the reactants in amounts representing equimolecular proportions of unsaturated compound and bromine. Inasmuch as bromine gives in solution a red color, progress of the reaction—as well as the requisite amount of bromine—can be ascertained by disappearance of the red color. It is preferred that the reaction be carried out away from any source of intense light to avoid possible alternate reactions.

In carrying out the reaction, the reactants are contacted with one another in a reaction medium as described. Most typically, the bromine is dissolved in a liquid reaction medium and thereafter contacted with the unsaturated compound. The reaction goes forward rapidly, as indicated by disappearance of the red color, with the preparation in the reaction mixture of the desired product of the present invention. Sometimes higher yields can be obtained, however, by permitting the reaction mixture to stand for a period of time. The product is separated from the reaction mixture in conventional procedures. Most typically, the reaction mixture is concentrated by evaporation of the reaction medium under subatmospheric pressure, to obtain the product as a residue. If desired, the product so separated can be purified, similarly in conventional procedures.

A particularly preferred group of compounds in accordance with the present invention are those of the following formula:

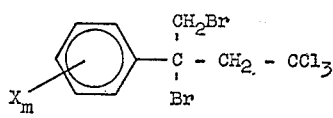

wherein $m$ represents one. These compounds exhibit to an enhanced degree the utility found for the products of the present invention, generally; in addition, apparently due to the presence of the ring substituent, they are more stable to loss of hydrogen bromide than the unsubstituted compound of the present invention.

The following examples illustrate the present invention and will enable those skilled in the art to practice the same.

EXAMPLE 1

(1-bromo-1-(bromomethyl)-3,3,3-trichloropropyl)-benzene (1 - methylene - 3,3,3 - trichloropropyl)benzene (23.5 grams; 0.1 mole) was dissolved in 50 milliliters of carbon tetrachloride and the resulting solution cooled to 10° C. while a second solution of bromine (16.0 grams; 0.1 mole) in 50 milliliters of carbon tetrachloride was added portionwise over a period of 90 minutes. The reaction mixture was shielded from strong light during the addition. Thereafter, the reaction mixture was stirred for twenty minutes and concentrated under subatmospheric pressure, keeping the temperature below 35° C., to obtain the desired (1 - bromo-1-(bromomethyl)-3,3,3-trichloropropyl)-benzene product, a viscous liquid, $n_D^{25} = 1.5964$.

EXAMPLES 2–8

Other unsaturated compounds are similarly brominated, in accordance with the procedures of Example 1 and the foregoing teachings, to yield other products of the present invention. Such other products include the following:

4 - nitro - 1 - (1-bromo-1-(bromomethyl)-3,3,3-trichloropropyl)benzene, $n_D^{25} = 1.6172$;
4 - chloro - 1-(1-bromo-1-(bromomethyl)-3,3,3-trichloropropyl)benzene, $n_D^{25} = 1.6146$;
3 - (trifluoromethyl) - 1 - (1-bromo-1-(bromomethyl)-3,3,3-trichloropropyl)benzene, $n_D^{25} = 1.5476$;
3 - bromo - 1-(1-bromo-1-(bromomethyl)-3,3,3-trichloropropyl)benzene, $n_D^{25} = 1.6245$;
3 - cyano - 1 - (1-bromo-1-(bromomethyl)-3,3,3-trichloropropyl)benzene, $n_D^{25} = 1.6059$;
3 - nitro - 1 - (1-bromo-1-(bromomethyl)-3,3,3-trichloropropyl)benzene, $n_D^{25} = 1.6172$; and
2 - chloro - 1-(1-bromo-1-(bromomethyl)-3,3,3-trichloropropyl)benzene, $n_D^{25} = 1.6079$.

The products of the present invention, as noted foregoing, are useful as agents to control the growth of plants, particularly as agents to selectively control the growth of plants. For example, the compounds of the present invention are generally toxic to weed species, such as crabgrass and wild oats, at rates which are innocuous or essentially innocuous to crop species, such as corn. Thus, by selection of rates, the compounds can be employed to obtain eradication of weeds in crops. In addition, the products of the present invention can be employed for the control of bacteria and fungi, such as, for example, bacteria and fungi causing paper pulp slime, *Streptococcus, Pseudomonas aeruginosa, Bacillus subtilis, Salmonella typhosa, Candida pelliculosa, Pullularia pullulans, Rhizopus nigricans, Aerobacter aerogenes, Staphylococcus aureus, Trichophyton mentagrophytes, Candida albicans*, and others.

In employing the compounds of the present invention as plant growth control agents, the unmodified compounds can be used. Preferably, however, compositions comprising the compounds are employed. For example, the compounds can be dispersed on a finely divided solid and employed as dusts. Also, such mixtures can be dispersed in water with the aid of a wetting agent and the resulting aqueous suspensions employed as sprays. In other procedures, the products can be employed as constituents of organic liquid solutions, or oil-in-water or water-in-oil emulsions or water dispersions with or without the addition of wetting, dispersing or emulsifying agents.

In representative operations, an aqueous composition containing as sole active toxicant 4-chloro-1-(1-bromo-1-(bromomethyl)-3,3,3-trichloropropyl)benzene was applied to plots previously seeded with corn and crabgrass. Application of the composition was made at a rate to provide 2 pounds of the toxicant per acre. Thereafter, the plots were held under good agricultural conditions for a period of about two weeks and then examined. It was found that there was a thriving stand of corn seedlings; but no crabgrass seedlings were found. In a control operation, other plots seeded with corn and crabgrass were held for the same period of time; observation showed thriving stands of both corn and crabgrass.

In other operations, an aqueous composition containing as sole active toxicant 2,000 parts of 3-(trifluoromethyl)-1-(1-bromo-1-(bromomethyl)-3,3,3-trichloropropyl)benzene per million parts by weight of ultimate composition was applied, as a spray and to the point of run-off, to stands of corn, pigweeds, and crabgrass. The stands were maintained for a period of about two weeks, then observed. The corn plants were thriving; but there was a complete eradication of the pigweeds, and an essentially complete (90 percent) eradication of crabgrass.

Products of the present invention which are especially preferred for such selective control of the growth of plants are those of the following formula:

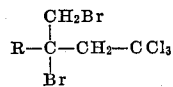

wherein R represents a monosubstituted phenyl radical which is p-substituted phenyl or m-substituted phenyl, the substituent thereof being bromo, chloro, nitro, cyano, or (trifluoromethyl).

In further operations, representative compounds of the present invention were evaluated for their effectiveness in controlling bacteria and fungi. In one operation, each of (1-bromo-1-(bromomethyl) - 3,3,3 - trichloropropyl)benzene and 4-chloro-1-(1-bromo-1-(bromomethyl) - 3,3,3-trichloropropyl)benzene was separately dispersed in a sterile nutrient medium at a concentration of 500 parts of the compound per million parts by weight of the total composition, each resulting medium thereafter inoculated with *Bacillus subtilis*, and the resulting media incubated for 48 hours. Observations at the end of the forty-eight hour period showed a complete inhibition of the growth of the organism in each medium. In the same procedures, 2-chloro-1-(1-bromo-1-(bromomethyl) - 3,3,3 - trichloropropyl)benzene was evaluated for the control of *Trichophyton mentagrophytes*; observations at the end of the forty-eight hour period showed a complete inhibition of the growth of the organism.

The unsaturated compounds to be employed as starting materials in accordance with the present invention

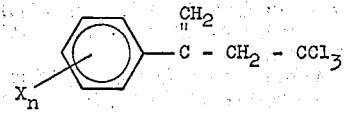

are themselves readily synthesized. They are conveniently prepared by addition of carbon tetrachloride to an α-methylstyrene compound of the formula

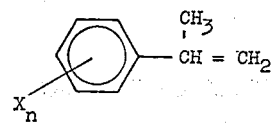

The addition is catalyzed by the use of a free radical initiator, preferably the combination of a minor amount of each of (1) copper and (2) an organic amine. The addition results in the corresponding 1:1 addition product, which is then dehydrochlorinated to obtain the desired starting material.

In the instance of those starting materials in which n represents one and X represents nitro, an alternate method of preparation is available, and, for the ortho and para isomers, preferred. In this alternate method, a starting material in which n represents zero is nitrated; good results are obtained when employing, as nitrating agent, either a mixture of nitric and sulfuric acids; or a mixture of acetic anhydride and nitric acid, yielding, in situ, acetyl nitrate. The nitration reaction is carried out under conditions of temperature, pressure, molecular amounts, etc. in accordance with those taught by the prior art for nitration reactions.

We claim:
1. Compound of the formula

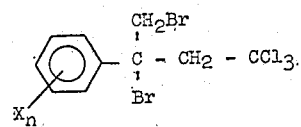

wherein X represents bromo, chloro, or (trifluoromethyl) and n represents an integer of from 0 to 1.

2. The compound of claim 1 which is (1 - bromo - 1-(bromomethyl)-3,3,3-trichloropropyl)benzene.

3. The compound of claim 1 which is 4-chloro-1-(1-bromo-1-(bromomethyl)-3,3,3-trichloropropyl)benzene.

4. The compound of claim 1 which is 3-(trifluoromethyl)-1-(1-bromo-1-(bromomethyl) - 3,3,3-trichloropropyl)benzene.

5. The compound of claim 1 which is 3-bromo-1-(1-bromo-1-(bromomethyl)-3,3,3-trichloropropyl)benzene.

References Cited

UNITED STATES PATENTS 2,813,131  11/1957  Kundiger et al. _____ 260—651
3,373,011   3/1968  Mussell _____ 260—651 X CHARLES B. PARKER, Primary Examiner D. H. TORRENCE, Assistant Examiner U.S. Cl. X.R.

71—105, 125, 126; 260— 465, 646; 424—304, 349, 353